US 9,360,047 B2

(12) United States Patent
Sadi-Haddad et al.

(10) Patent No.: US 9,360,047 B2
(45) Date of Patent: Jun. 7, 2016

(54) DIGITAL NONLINEAR CORRECTOR FOR ACTIVE MAGNETIC BEARINGS

(71) Applicants: Lakdar Sadi-Haddad, Allonne (FR); Joaquim Da Silva, Sennely (FR); Olivier Lemarchand, Guichainville (FR)

(72) Inventors: Lakdar Sadi-Haddad, Allonne (FR); Joaquim Da Silva, Sennely (FR); Olivier Lemarchand, Guichainville (FR)

(73) Assignee: SKF MAGNETIC MECHATRONICS, Saint-Marcel (FR)

( * ) Notice: Subject to any disclaimer, the term of this patent is extended or adjusted under 35 U.S.C. 154(b) by 0 days.

(21) Appl. No.: 14/571,544

(22) Filed: Dec. 16, 2014

(65) Prior Publication Data

US 2015/0167733 A1 Jun. 18, 2015

(30) Foreign Application Priority Data

Dec. 17, 2013 (EP) .................................. 13306740

(51) Int. Cl.
*F16C 32/04* (2006.01)

(52) U.S. Cl.
CPC ......... *F16C 32/0444* (2013.01); *F16C 32/0451* (2013.01); *F16C 32/0455* (2013.01)

(58) Field of Classification Search
CPC .................................................. F16C 32/0444
USPC ........................................ 318/610, 609, 560
See application file for complete search history.

(56) References Cited

U.S. PATENT DOCUMENTS 3,508,444 A      4/1970  Sitomer et al.
5,894,205 A  *   4/1999  Shimizu et al. ............... 318/432

FOREIGN PATENT DOCUMENTS

EP       0473232 A1   3/1992
EP       0875685 A2   11/1998
FR       2706549 A1   12/1994

* cited by examiner

*Primary Examiner* — David S Luo
(74) *Attorney, Agent, or Firm* — Bryan Peckjian; SKF USA Inc. Patent Dept.

(57) ABSTRACT

A digital nonlinear corrector of an active magnetic bearing receiving an input signal x(t) and outputting an output control signal u(t) for controlling the position of said active magnetic bearing, the input signal being digitalized by a ADC circuit and provided to an adder, the digital nonlinear corrector comprising a closed control loop delivering an intermediary sequence of numbers y[kT] and having a direct branch comprising a first proportional gain circuit and a feedback branch comprising a series connection of a low-pass filter and a dead zone circuit, such that said low-pass filter is activated when determined upper and lower values of said output control signal are reached, the output control signal reproducing the input signal when these determined upper and lower values are not reached.

8 Claims, 1 Drawing Sheet

DIGITAL NONLINEAR CORRECTOR FOR ACTIVE MAGNETIC BEARINGS

CROSS REFERENCE TO RELATED APPLICATION

This is a United States Non-Provisional Patent Application claiming the benefit of European Patent Application Number EP13306740 filed on 17 Dec. 2013 (17.12.2013), which is incorporated herein by reference in its entirety.

TECHNICAL FIELD

The present invention relates to a corrector to be implemented in a servo circuit with active magnetic bearings.

PRIOR ART

Conventionally, the control loop of an active magnetic bearing (PMA) provided with at least one electromagnet coil comprises a detector of the position of the rotor assembly, a correction network and a power amplifier for supplying power to the electromagnet coils. The output signal of the correction network drives the electromagnet coils, the current required being supplied by the power amplifiers which are each looped by a current proportional to the variation of the air gap flux in the PMA.

The PMA uses a correction network having a proportional, integral and derivative (PID) transfer function. This function is defined so as to obtain an optimal operating close to the natural (Eigen) frequency of the servo circuit, that is to say with a high gain, a high stiffness and a low response time.

Thus, this network is defined such that, firstly, it appears at the natural frequency a determined lead phase to damp the system and, secondly, the cutoff frequency of the integral action of the correction network is as close as possible to the natural frequency to obtain high stiffness.

Such a correction is satisfactory as long as the amplitude of the oscillations in the PMA, which can be defined by the maximum amplitude of oscillations of the movable mass at the natural frequency of the servo circuit, remains in a linear range.

More the natural frequency and the stiffness of the servo circuit are high more this linear range is reduced. This limitation is due, firstly, to the maximum force of the electromagnet depending on the bearing surface of the PMA and the saturation induction of the magnetic material and, secondly, to the maximum power of the power amplifier based on its supply voltage and the maximum current output.

Outside the linear range, for example in the presence of large amplitude oscillations caused by a disturbance force greater than the load capacity of the magnetic bearing, saturation of the force of the electromagnet or of the power of the amplifier causes a decrease in the gain and the natural frequency of the servo circuit, but also a phase lag which has the effect to reduce or cancel the phase advance provided by the derivative action of the correction network. This results an instability, the consequences of which can be particularly detrimental to the PMA (effect called as "jackhammer").

A known solution for remedying to this instability is disclosed by FR2706549 and consists to provide a correction network adjusting the proportional gain as a function of the amplitude of the oscillations and providing a supplementary phase advance only during operation out of its linear range.

SUMMARY OF THE INVENTION

The present invention aims to eliminate the above disadvantages and propose a digital nonlinear corrector reducing the stiffness and natural frequency of the servo circuit and oversizing the phase advance.

According to the invention, it is provided a digital nonlinear corrector of an active magnetic bearing receiving an input signal x(t) and outputting an output control signal u(t) for controlling the position of said active magnetic bearing, the input signal being digitalized by a ADC circuit and provided to an adder, characterized in that it comprises a closed control loop delivering an intermediary sequence of numbers y[kT] and having a direct branch comprising a first proportional gain circuit and a feedback branch comprising a series connection of a low-pass filter and a dead zone circuit, such that said low-pass filter is activated when determined upper and lower values of said output control signal are reached, the output control signal reproducing the input signal when these determined upper and lower values are not reached.

With this configuration, inside the linear range the output is equal to the input and outside the linear range the closed loop transfer function corresponds to a phase lead transfer function.

According to another feature of the invention, the output of said adder provides a final sequence of numbers u[kT] from which said output control signal controlling the position of said active magnetic bearing is delivered.

Preferably, said low-pass filter has a cutoff frequency determined to create a sufficient phase lead to avoid the instability of the active magnetic bearing.

Advantageously, the input i[kT] and output o[kT] sequences of said dead zone circuit verify the following conditions:

For module($i[kT]$)<$\Delta/2$=>$o[kT]$=0

For $i[kT] \geq \Delta/2$ => $o[kT]=i[kT]\cdot\Delta/2$

For $i[kT] \leq -\Delta/2$ => $o[kT]=i[kT]+\Delta/2$

Where $\Delta$ is a determined threshold value corresponding to a percentage of the air gap (preferably in the range of 30 to 50%) of said active magnetic bearing.

BRIEF DESCRIPTION OF THE DRAWINGS

The invention will be better understood and further details and advantages thereof will appear more clearly in the following description with reference to the accompanying drawings illustrating embodiments of the invention, and in which.

DETAILED DESCRIPTION

Figure 1:
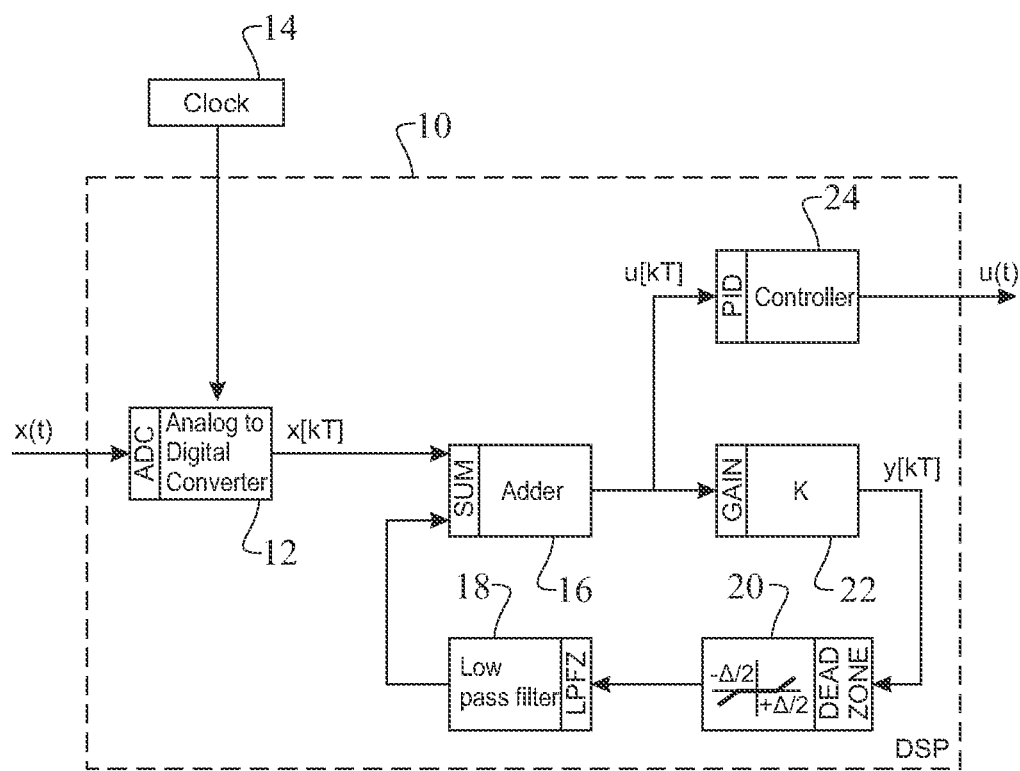
FIG. 1 illustrates an embodiment of a digital nonlinear corrector of an active magnetic bearing according to the invention.

FIG. 1 shows a preferred embodiment of a digital nonlinear corrector according to the invention for providing an absorbed movement for PMA when it is subjected to large amplitude oscillations.

Figure 2:
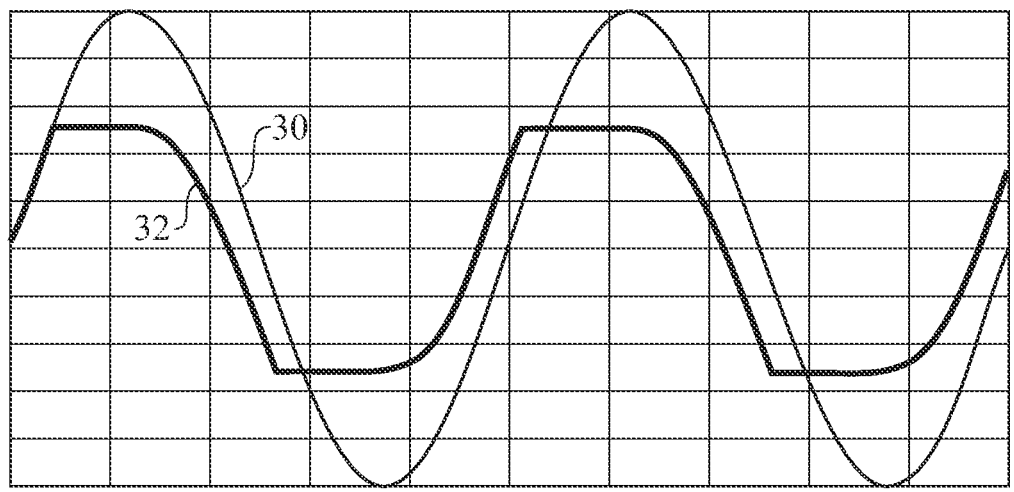
FIG. 2 shows significant signals of the digital non-linear corrector of FIG. 1.

This digital nonlinear corrector 10 is introduced into the position control loop (not illustrated). The measured position (curve 30 of FIG. 2) of the PMA x(t) is converted into digital form x[kT] by an analog-to-digital converter (ADC 12) at sampling instants k defined by a synchronization clock 14 of period T (as known the sampling frequency is chosen in accordance with the bandwidth of the PMA). The first sequence of numbers delivered by the ADC 12 is added in an adder 16 with a second sequence of numbers delivered, in a feedback branch of the corrector, by a low-pass filter 18 receiving the output of a dead zone circuit 20 which input is supplied by an intermediary sequence of numbers y[kT] provided by the adder 16 through a first proportional gain circuit 22 of gain factor K in a direct branch of the corrector. The output of the adder 16 generates a final sequence of numbers u[kT] (curve 32 of FIG. 2) for a controller 24 having advantageously proportional, integral and derivative (PID) transfer function and which generates the signal u(t) for the control of the position of the PMA.

The low-pass filter 18 has a determined cutoff frequency in order to create a sufficient phase lead to avoid the instability of the PMA.

The input i[kT] and output o[kT] sequences of the dead zone circuit 20 must verify the following conditions:

$$\text{For module}(i[kT]) < \Delta/2 => o[kT] = 0$$

$$\text{For } i[kT] \geq \Delta/2 => o[kT] = i[kT] - \Delta/2$$

$$\text{For } i[kT] \leq -\Delta/2 => o[kT] = i[kT] + \Delta/2$$

Where $\Delta$ is a determined threshold value corresponding to a percentage of the air gap (generally in the range of 30 to 50% of the maximal position of the rotor).

The digital nonlinear corrector 10 is for example run on a digital signal processor (DSP) of the type F2812 supplied from the US Company Texas Instruments.

The implementation of the digital nonlinear corrector according to the invention in a magnetic bearing compressor can better assess the practical interest of such a corrector. The following numerical values are considered:

For a given K and a given constant time of the low-pass filter the phase lead introduced by the described nonlinear closed loop control that can be easily calculated through the closed loop transfer function is given by:

$$U(p)/Y(p) = (K/(1+K)) \times (1+aT1p)/(1+T1p)$$

Where $A = 1+K$ and $T1 = (1/(1+K)) \times T$

Then the upper and lower limits of the deadzone function are fixed as a percentage (generally in the range of 30 to 50%) of the maximum air gap multiplied by the coefficient K.

$$\Delta/2 = 0.5 \times K$$

$$-\Delta/2 = -0.5 \times K$$

Assuming that the gap of the magnetic bearing is much larger than the extent of the linear range, any amplitude of oscillation higher than this gap brings an amplifier overload and correspondingly creates instability of the PMA due to the decrease in both the gain and the natural frequency of the servo circuit. The simple solution of the invention by a series connection of a low-pass filter and a dead zone circuit in the feedback branch of the corrector introduces the phase lead necessary for the stability of the servo circuit.

The invention claimed is:

1. A digital nonlinear corrector of an active magnetic bearing receiving an input signal x(t) and outputting an output control signal u(t) for controlling the position of said active magnetic bearing, the input signal being digitalized by an analog-to-digital converter circuit and provided to an adder, comprising:

a closed control loop delivering an intermediary sequence of numbers y[kT] and having a direct branch comprising a first proportional gain circuit and a feedback branch comprising a series connection of a low-pass filter and a dead zone circuit, such that said low-pass filter is activated when determined upper and lower values of said output control signal are reached, the output control signal reproducing the input signal when these determined upper and lower values are not reached.

2. The digital nonlinear corrector of claim 1, wherein the output of said adder provides a final sequence of numbers u[kT] from which said output control signal controlling the position of said active magnetic bearing is delivered.

3. The digital nonlinear corrector of claim 2, wherein said low-pass filter has a cutoff frequency determined to create a sufficient phase lead to avoid the instability of the active magnetic bearing.

4. The digital nonlinear corrector of claim 2, wherein the input i[kT] and output o[kT] sequences of said dead zone circuit verify the following conditions:

$$\text{For module}(i[kT]) < \Delta/2 => o[kT] = 0,$$

$$\text{For } i[kT] \geq \Delta/2 => o[kT] = i[kT] - \Delta/2, \text{ and}$$

$$\text{For } i[kT] \leq -\Delta/2 => o[kT] = i[kT] + \Delta/2,$$

where $\Delta$ is a determined threshold value corresponding to a percentage of an air gap of said active magnetic bearing.

5. The digital nonlinear corrector of claim 4, wherein said percentage of the air gap is in a range of 30 to 50%.

6. The digital nonlinear corrector of claim 1, wherein the input i[kT] and output o[kT] sequences of said dead zone circuit verify the following conditions:

$$\text{For module}(i[kT]) < \Delta/2 => o[kT] = 0,$$

$$\text{For } i[kT] \geq \Delta/2 => o[kT] = i[kT] - \Delta/2, \text{ and}$$

$$\text{For } i[kT] \leq -\Delta/2 => o[kT] = i[kT] + \Delta/2,$$

where $\Delta$ is a determined threshold value corresponding to a percentage of an air gap of said active magnetic bearing.

7. The digital nonlinear corrector of claim 6, wherein said percentage of the air gap is in a range of 30 to 50%.

8. The digital nonlinear corrector of claim 1, wherein said low-pass filter has a cutoff frequency determined to create a sufficient phase lead to avoid the instability of the active magnetic bearing.

* * * * *